US006872036B2

(12) United States Patent  (10) Patent No.: US 6,872,036 B2
Linderholm  (45) Date of Patent: Mar. 29, 2005

(54) HAND TOOL APPARATUS FOR ORBITAL DRILLING

(75) Inventor: Dag G. Linderholm, Rönninge (SE)

(73) Assignee: Novator AB, Spanga (SE)

( * ) Notice: Subject to any disclaimer, the term of this patent is extended or adjusted under 35 U.S.C. 154(b) by 0 days.

(21) Appl. No.: 10/345,510

(22) Filed: Jan. 16, 2003

(65) Prior Publication Data

US 2003/0143049 A1 Jul. 31, 2003

Related U.S. Application Data

(62) Division of application No. 10/083,935, filed on Feb. 27, 2002, which is a continuation of application No. 09/388,419, filed on Sep. 1, 1999, now Pat. No. 6,382,890.

(51) Int. Cl.$^7$ .................................................. B23C 1/20
(52) U.S. Cl. .................. 409/200; 409/218; 409/214; 409/143; 408/14; 408/97; 408/95; 408/241 S; 408/113
(58) Field of Search ............................. 408/14, 17, 97, 408/95, 241 S, 113, 98; 409/219, 143, 200, 191, 218, 214

(56) References Cited

U.S. PATENT DOCUMENTS

| | | | | |
|---|---|---|---|---|
| 2,541,306 A | * | 2/1951 | Taylor | ........................ 408/97 |
| 2,648,939 A | | 8/1953 | Zelik et al. | |
| 2,742,796 A | | 4/1956 | Zorich | |
| 2,929,300 A | | 3/1960 | Zwick | |
| 3,119,210 A | | 1/1964 | Doeden | |
| 3,454,059 A | * | 7/1969 | Sindelar | ...................... 408/113 |
| 3,533,195 A | | 10/1970 | Schumann et al. | |
| 3,540,347 A | | 11/1970 | Randall | |
| 3,724,964 A | * | 4/1973 | Needham, Jr. | ................ 408/14 |
| 3,803,981 A | | 4/1974 | Allgeyer | |
| 4,299,294 A | * | 11/1981 | Womack | ...................... 408/130 |
| 4,557,338 A | | 12/1985 | Baatrup | |
| 4,592,257 A | * | 6/1986 | Durr | .......................... 408/202 |
| 4,647,260 A | * | 3/1987 | O—Hara et al. | ......... 408/241 S |

(Continued)

FOREIGN PATENT DOCUMENTS

| | | |
|---|---|---|
| DE | 1 273 303 | 7/1968 |
| DE | 25 42 679 | 6/1978 |
| DE | 3912991 A1 * | 10/1990 |
| EP | 0 307 823 | 3/1989 |
| EP | 0 571 352 A2 | 11/1993 |
| EP | 000591096 A1 * | 4/1994 |
| SE | 99369 | 7/1940 |
| SE | 124014 | 2/1949 |
| SE | 173 899 | 1/1961 |
| SE | 7008559-2 | 2/1976 |
| WO | WO 94/17944 | 8/1994 |
| WO | PCT/SE94/00085 | 10/1995 |

*Primary Examiner*—Erica Cadugan
(74) *Attorney, Agent, or Firm*—Taylor & Aust, P.C.

(57) ABSTRACT

A hand tool apparatus uses a cutting tool with a first width and a tool axis to machine a hole in an object. The hole has a second width at least as large as the first width of the cutting tool. The tool axis passes through a predetermined point on a surface of the object. The apparatus includes an actuating assembly including a housing. The housing contains an axial feed mechanism configured for moving the cutting tool in an axial direction, a spindle motor configured for rotating the cutting tool about the tool axis, and a radial offset mechanism. The radial offset mechanism is configured for moving the axial feed mechanism in a radial direction such that the tool axis is offset from a principal axis. A motor is configured for rotating said axial feed mechanism and the cutting tool about the principal axis.

1 Claim, 5 Drawing Sheets

U.S. PATENT DOCUMENTS

| | | | |
|---|---|---|---|
| 4,934,040 A | | 6/1990 | Turchan |
| 5,030,042 A | | 7/1991 | Haga et al. |
| 5,061,125 A | * | 10/1991 | Kuppinger .................. 408/150 |
| 5,073,068 A | | 12/1991 | Jinkins et al. |
| 5,203,650 A | * | 4/1993 | McCourtney ................. 408/14 |
| 5,341,704 A | * | 8/1994 | Klemm ........................ 81/429 |
| 5,380,132 A | * | 1/1995 | Parks ......................... 408/113 |
| 5,601,387 A | * | 2/1997 | Sanford et al. ............. 408/113 |
| 5,613,810 A | | 3/1997 | Bureller |
| 5,641,252 A | | 6/1997 | Eriksson et al. |
| 5,918,685 A | * | 7/1999 | Ulbrich et al. ............. 408/202 |
| 5,971,678 A | | 10/1999 | Linderholm |
| 6,158,929 A | * | 12/2000 | Fisher ........................ 408/14 |
| 6,587,184 B2 | * | 7/2003 | Wursch et al. ................ 408/13 |

* cited by examiner

HAND TOOL APPARATUS FOR ORBITAL DRILLING

This is a divisional of application Ser. No. 10/083,935 tiled Feb. 27, 2002, which is a continuation of application Ser. No. 09/388,419 now U.S. Pat. No. 6,382,890 filed Sep. 1, 1999.

BACKGROUND OF THE INVENTION

1. Field of the Invention

The present invention relates to a hand tool for cutting a hole in an object, and, more particularly, a hand tool for cutting a hole that has a larger diameter than the diameter of the cutting tool.

2. Description of the Related Art

U.S. Pat. No. 5,641,252 discloses a method for machining holes in a fiber reinforced composite material by using at least one cutting tool with wear resistant surface positioned eccentrically in relation to a central axis. The material is machined simultaneously in both an axial and a radial direction by causing the tool to move axially while rotating not only about its own axis, but also eccentrically about the central axis. In accordance with one particular characterizing feature of the invention, the workpiece is oriented in such a way that the axis of rotation of the tool is essentially orthogonal in relation to the longitudinal directions of the fibers in the immediate vicinity of the point where the tool meets the working surface. The diameter of the cutting tool is substantially smaller than the diameter of the hole that is produced. The eccentric rotary motion is generally a strictly rotary motion, i.e., it is executed with a constant distance between the central axis and the axis of rotation of the cutting tool. This distance between the central axis and the axis of rotation of the cutting tool can be increased by linear increments as the eccentric rotary motion continues.

This known method has a number of substantial advantages as compared with generally familiar techniques. For example, the method permits the production of holes without strength reducing damage. Also, the method permits the production of holes free from damage without having to preform a hole. Further, the method permits the production of holes to tight tolerances. The dimensional accuracy of the hole is determined substantially by the accuracy of the positioning of the tool relative to the central axis. The requirements imposed on the geometry of the cutting tool are not particularly high, on the other hand, since every individual tool is simply calibrated before use. Additionally, the method prevents the tool from becoming blocked. Since the diameter of the tool is substantially smaller than that of the hole, the method permits material removed by cutting to be carried away by simple means, such as with compressed air. The method also permits effective cooling of the tool and the edge of the hole. Yet another advantage is that the method substantially reduces the cost of wear compared to previously disclosed methods, due to the tool being coated with a wear resistant material, such as diamond coating. Moreover, this method also offers advantages when machining other materials such as metals.

U.S. patent application Ser. No. 09/092,467 discloses a spindle unit that includes a spindle motor that is rotatable about a principal axis. The spindle motor includes a tool holder having a tool axis substantially parallel to the principal axis. The tool holder is rotatable about the tool axis. An axial actuator is configured for moving the spindle motor in an axial feed direction substantially parallel to each of the principal axis and the tool axis. A radial actuator adjusts a radial distance between the principal axis and the tool axis. This spindle unit can be mounted in a stationary machine such as a CNC machine, robot or a simple rig.

PCT application PCT/SE94/00085 discloses a hand tool machine for machining holes according to the above described technique This disclosure relates to a hand machine for making holes in an object made of composite fibers, preferably with a curved surface. The center axis of the hole passes through a predetermined point on the surface of the object and is oriented in a certain direction relative to the longitudinal direction of the fibers of the object which are close to the point. The machine includes, in combination, a tool holder rotating about its own axis and a principal axis, a device for adjusting the axis of rotation of the tool holder in the normal direction of the surface at the point, a device for axial feeding of the tool holder relative to the object, a device for adjusting the radial distance between the principal axis and the axis of rotation of the tool holder, and a device for taking up the forces and moments between the machine and the object that result from the making of the holes.

Although this aforementioned disclosure outlines some principles, the disclosed hand tool does not offer a feasible and practical solution. One obvious limitation is that the disclosed concepts do not present a solution for the power supply and therefore their potential or realization must be questioned. One basic requirement for a hand tool is lightweight and user friendliness. The disclosed concepts do not provide a compact integrated light-weight design. Furthermore, the illustrated concepts show solutions which require a very long tool overhang, which is a severe limitation due to the radial cutting force, which creates a bending moment on the cutting tool.

When machining holes according to the proposed method, i.e., by positioning the tool eccentrically in relation to a cental axis and machining simultaneously in both an axial and radial direction by causing the tool to move axially and to rotate not only about its own axis, but also eccentrically about a central axis, the tip of the tool is subjected to both an axial force and a radial force. The radial force creates bending moment on the tool, the magnitude of which is dependent on both the magnitude of the force and on the length of the tool overhang (moment arm). It is desirable to minimize the bending moment for optimal machining accuracy. This can be achieved by minimizing the tool overhang, i.e., the free length of the tool. The concepts illustrated in PCT/SE94/00085 show situations where the tool overhang is determined by the thickness of the hole template and by the thickness of the workpiece. Since the thickness of the template may be substantial, the tool overhang may be accordingly substantial.

SUMMARY OF THE INVENTION

The present invention provides a hand tool apparatus using a cutting tool to machine a hole in an object such that the hole has a width at least as large as the width of the cutting tool. The center line of the hole passes through a predetermined point on the surface of the object. Moreover, the present invention provides a compact and lightweight hand tool apparatus for machining holes in a flat or curved object of any material by rotating a cutting tool about its own axis and about a principal axis while simultaneously feeding in the axial direction. A lightweight and compact apparatus is achieved by integrating a radial offset mechanism, spindle motor and axial feed mechanism in a same actuating assembly package, which rotates about a principal axis.

The invention comprises, in one form thereof, a hand tool apparatus using a cutting tool with a first width and a tool axis to machine a hole in an object. The hole has a second width at least as large as the first width of the cutting tool. The tool axis passes through a predetermined point on a surface of the object. The apparatus includes an actuating assembly including a housing. The housing contains an axial feed mechanism configured for moving the cutting tool in an axial direction, a spindle motor configured for rotating the cutting tool about the tool axis, and a radial offset mechanism. The radial offset mechanism is configured for moving the axial feed mechanism in a radial direction such that the tool axis is offset from a principal axis. A motor is configured for rotating said axial feed mechanism and the cutting tool about the principal axis.

An advantage of the present invention is that the hand tool is more lightweight and compact than the previous devices.

Another advantage is that the tool overhang is minimized, thereby reducing the bending, moment on the cutting tool.

Yet another advantage is that the tool can be mounted into the tool holder from the rear, thereby allowing the tool holder to have a conical shape which minimizes the required diameter of the holes in the template.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 8A is a schematic, sectional view, taken along line 3—3 of FIG. 1, of the relative positions of the tool, inner sleeve and outer sleeve;

FIG. 8B is a view similar to FIG. 8A, with the inner sleeve rotated 90° counterclockwise relative to its position in FIG. 8A; and FIG. 8C is a view similar to FIG. 8A, with the inner sleeve rotated 180° counterclockwise relative to its position in FIG. 8A.

Figure 1:
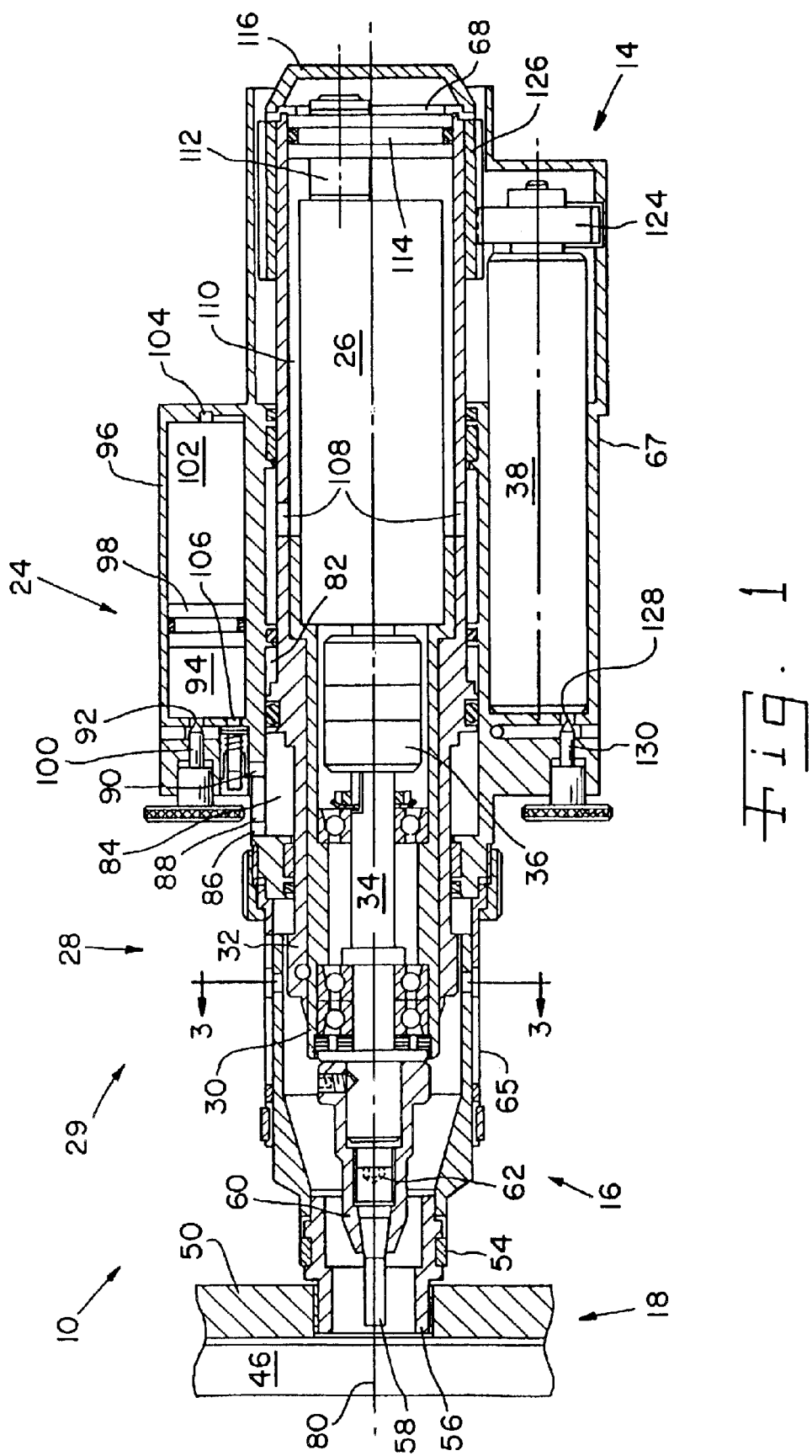
FIG. 1 is a top, sectional view of one embodiment of a pneumatic portable drill of the present invention.
Figure 2:
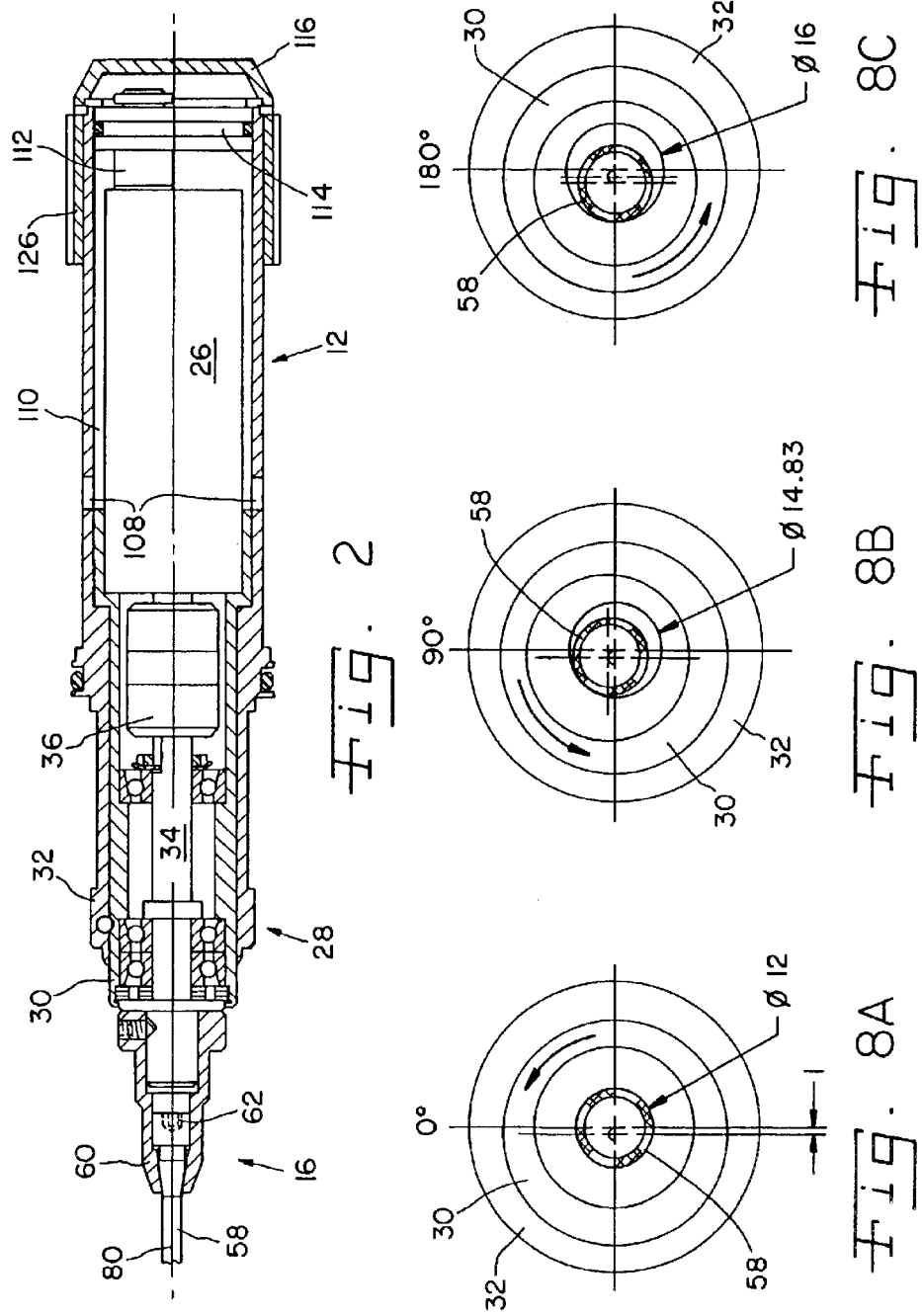
FIG. 2 is a top, sectional view of the tool assembly and a portion of the actuating assembly of the pneumatic portable drill of FIG. 1.

Corresponding reference characters indicate corresponding parts throughout the several views. The exemplifications set out herein illustrates one preferred embodiment of the invention, in one form, and such exemplifications are not to be construed as limiting the scope of the invention in any manner.

DETAILED DESCRIPTION OF THE INVENTION

Figure 6:
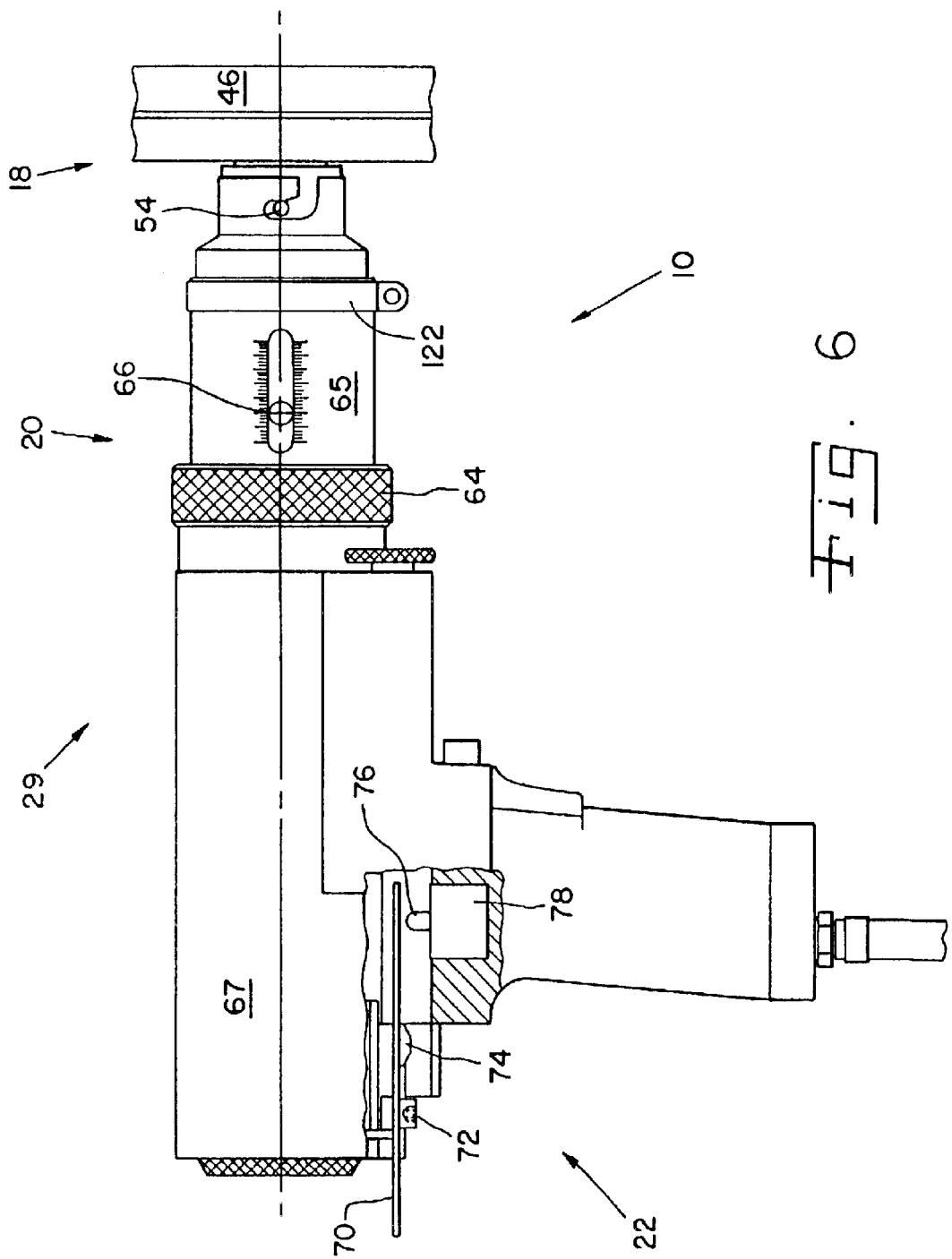
FIG. 6 is a side view of the pneumatic portable drill of FIG. 1.

Referring now to the drawings and particularly to FIG. 1, there is shown a hand tool apparatus in the form of a pneumatic portable drill 10 including an actuating assembly 12, eccentric rotation mechanism 14, tool assembly 16, template assembly 18, axial positioning mechanism 20 (FIG. 6), and stroke adjustment mechanism 22.

Actuating assembly 12 includes an axial feed mechanism 24, a spindle motor 26, and a radial offset mechanism 28 (FIG. 3), all contained within a single housing 29. Radial offset mechanism 28 includes a concentric cylindrical inner sleeve 30 positioned in a concentric cylindrical outer sleeve 32. Inner sleeve 30 and outer sleeve 32 are rotatable relative to each other. An axle or shaft 34 of spindle motor 26 extends through a clutch 36 and is rotatably mounted in inner sleeve 30.

Eccentric rotation mechanism 14 includes a motor 38 for rotating actuating assembly 12 and thereby tool assembly 16 about a principal axis 40.

Figures 4A, 4B:
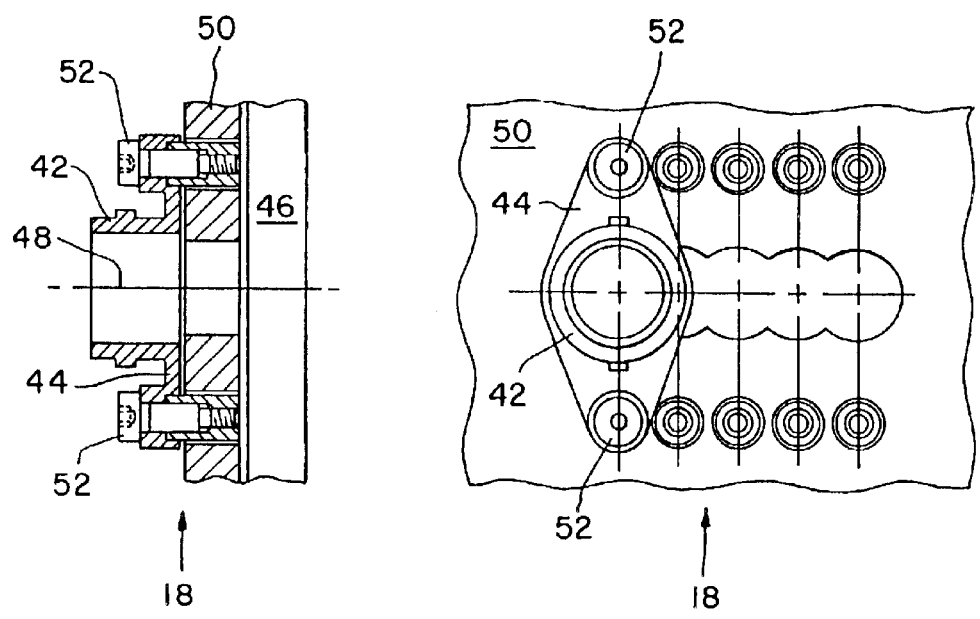
FIG. 4A is a side, sectional view of one embodiment of a template assembly of the portable drill of FIG. 1.
FIG. 4B is a rear view of the template assembly of FIG. 4A.

Template assembly 18 includes a sleeve 42 (FIG. 4A) with a flange 44 which is in contact with the surface of a work piece 46. A center axis 48 of sleeve 42 is oriented substantially perpendicular to the surface of work piece 46. Sleeve 42 and flange 44 are fastened to a template 50 by bolted joints 52. Tool assembly 16 is locked onto sleeve 42 by use of a bayonet socket 54, whereby the axis of rotation of drill 10 are oriented substantially perpendicular to the surface of work piece 46.

Figure 5A:
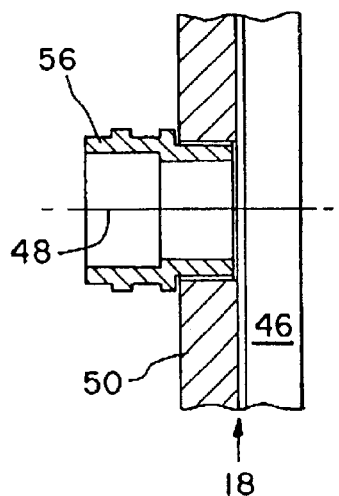
FIG. 5A is a side, sectional view of another embodiment of a template assembly of the pneumatic portable drill of FIG. 1.

In another embodiment, a sleeve 56 (FIG. 5A) is also oriented in the hole in template 50 such that axis of rotation 48 of sleeve 56 is substantially perpendicular to the surface of work piece 46. Sleeve 56 can be fixed to template 50 by use of a threaded joint, frictional joint or adhesive joint. Portable drill 10 is then locked onto sleeve 56 by use of a bayonet socket 54, as shown in FIG. 1, whereby the axes of rotation are oriented substantially perpendicular to the surface of work piece 46.

Tool assembly 16 includes a cutting tool 58, a tool holder 60 and a screw 62. To minimize the tool overhang, template 50 is designed such that tool holder 60 can be fed through the holes in template 50. In such case, it is desired that tool holder 60 have a small outer diameter, since in many situations it is required to machine multiple holes in work piece 46 with relatively short spacing distances between the holes. In order to accommodate all holes, the holes in template 50 can not be made arbitrarily large to make room for tool holder 60. Therefore, it is desirable for tool holder 60 to require as little space as possible. This is made possible by tool holder 60 and cutting tool 58 being provided with conical surfaces. Cutting toot 58 is mounted in tool holder 60 from the rear end and then tightened by screw 62 inside tool holder 60. By this concept, it is possible to obtain a space saving solution which allows the feeding of tool holder 60 through the holes in template 50 without requiring that the template holes be too large.

Figure 5B:
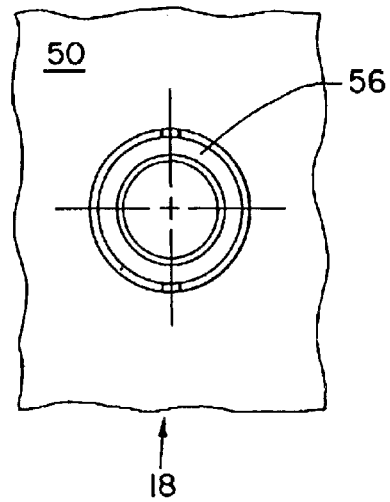
FIG. 5B is a rear view of the template assembly of FIG. 5A.

Although the aforementioned tool holder concept offers a space saving advantage, which allows feeding of tool holder 60 through template 50 without requiring very large holes in template 50, the spacing between the holes in work piece 46 may still be too small for the embodiment of FIGS. 1 and 5. In such case, drill 10 is locked to an alternative fixing device (FIG. 4B) which is fixed in template 50 by two screws 52 in two holes located a distance away from the main hole. Thus the holes in template 50 may be integrated, as in FIG. 4B, which is suitable in a case where the spacing between the holes in template 50 is small.

Axial positioning mechanism 20 includes a threaded ring 64 and a scale 66. It is desirable to roughly position the tip of cutting tool 58 a certain distance from work piece 46 as shown in FIG. 1. This is achieved by threaded ring 64 and is made possible in that housing 29 of portable drill 10 is separated at ring 64 into a front portion 65 and a rear portion 67. By turning ring 64, front portion 65 of drill housing 29 moves forward or backward, which movement is indicated by scale 66.

Figure 7:
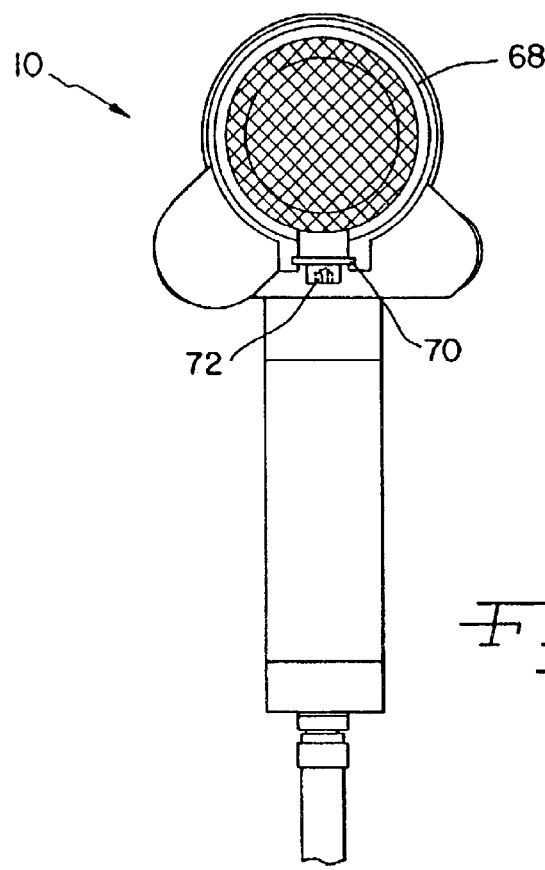
FIG. 7 is a rear view of the pneumatic portable drill of FIG. 1.

Stroke adjustment mechanism 22 includes a ring 68 (FIG. 7), a rod 70, a lock screw 72, a projection 74, an arm or latch 76 and a return mechanism 78. The stroke length of the machining operation is adjusted by mechanism 22. Ring 68 is rotatably attached to the drill housing. On ring 68 is fastened a rod 70. Rod 70 is provided with a slot (not shown) such that its axial position is adjustable. The desired position is fixed by lock screw 72. Projection 74, fixedly attached to rod 70, contacts arm 76 of return mechanism 78 and thereby forces drill 10 to make a return stroke after the contact.

In operation, actuating assembly 12 moves cutting tool 58 in an axial feed direction, and spindle motor 26 rotates cutting tool 58 about its own axis 80. Motor 38 rotates actuating assembly 12 and thereby cutting tool 58 about principle axis 40.

An axial feed motion directed towards work piece 46 is provided by supplying compressed air in a circumferential cavity 82. As actuating assembly 12 moves forward it forces oil, stored in another circumferential cavity 84, to flow through a radial hole 86 via an axial hole 88, another radial hole 90, and hole 92 into space 94 of cylinder 96, which contains oil. A piston 98 then moves to the right in FIG. 1 in order to allow for the volume increase. Thus provided is a hydraulicly damped axial movement.

The speed of the axial movement can be controlled by adjusting the position of a needle 100 in relation to hole 92. An axial feed motion directed away from work piece 46 (return stroke) is achieved by supplying compressed air into space 102, which contains air via a channel 104. The pressure increase in cylinder 96 due to the return stroke causes a valve 106 to open and oil to flow back into cavity 84 and thereby create a pressure increase, which causes actuating assembly 12 to move away from work piece 46. This design allows for a faster return stroke as compared to the forward feeding movement.

Air is supplied to spindle motor 26 through openings 108 in the wall element of outer sleeve 32 of actuating assembly 12. The air then flows in channel 110 to the rear end of spindle motor 26 and then through spindle motor 26 to cause rotation of shaft 34. The return flow is then directed through outlet 112 out to the open air. Outlet 112 rotates eccentrically in relation to the center axis of spindle motor 26. At the rear end is arranged a sealing 114 and an end piece 116 for reducing the sound level.

Outer sleeve 32 is turnable or rotatable relative to inner sleeve 30, and thereby the axis of rotation 80 of cutting tool 58 and principal axis 40 can be varied from zero (FIG. 8A) to a maximum value (FIG. 8C) by a relative rotation of 180° between the two sleeves 30, 32. FIG. 8A shows a case where a 12 millimeter tool 58 is in zero offset position. FIG. 8C shows a case where tool 58 is in its maximum radial offset position, i.e., tool 58 is offset two millimeters in order to machine a 16 millimeter hole.

Figure 3:
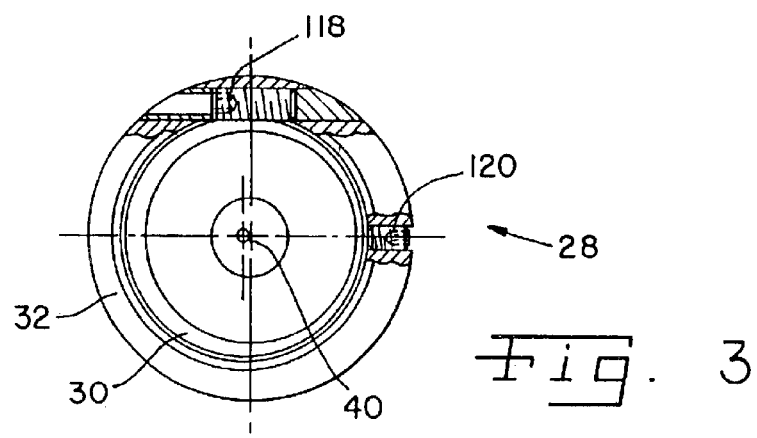
FIG. 3 is a rear, sectional view taken along line 3—3 in FIG. 1.

The relative movement between sleeves 30, 32 is achieved by turning a screw 118 (FIG. 3). A stop screw 120 locks sleeves 30 and 32 in a desired position. In order to adjust the offset, front portion 65 of housing 29 is removed by unlocking a tightening ring 122.

In order to rotate actuating assembly 12 and thereby cutting tool 58 about a principal axis 40, gear wheels 124, 126 transfer the rotation of motor 38 to actuating assembly 12. Since tool holder 60 is connected to inner sleeve 30 of actuating assembly 12, tool holder 60 and cutting tool 58 are forced into a rotation about principal axis 40.

Air is supplied through an opening 128. The speed of motor 38 is controlled by adjusting a needle 130 in opening 128. The outlet of the air supplied to motor 38 is not shown.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An axial feed control system for a hand-held drill, said system comprising:

a cutting tool extending in an axial direction;

a drive for rotating the cutting tool about an axis offset from the tool axis;

an axial positioning mechanism, including;

a rear housing connected to said cutting tool;

a front housing at least partially surrounding said cutting tool and configured to be non-rotatably attached relative to a workpiece by a bayonet socket; and a ring rotatably attached to one of said rear housing and said front housing, said ring being threadedly coupled to an other of said rear housing and said front housing such that rotation of said ring moves said cutting tool together with said rear housing in said axial direction relative to said front housing while maintaining said front and rear housings mutually non-rotatable; and a stroke length adjustment mechanism, including:

a return mechanism configured for reversing a direction of axial movement of said cutting tool from a forward direction to a backward direction;

a latch connected to said return mechanism, said latch being movable between a first position in which said return mechanism is not activated, and a second position in which said return mechanism is activated; and a projection having a position which varies with an axial position of said cutting tool, said projection being configured for engaging said latch to thereby move said latch from said first position to said second position.

* * * * *

UNITED STATES PATENT AND TRADEMARK OFFICE
CERTIFICATE OF CORRECTION

PATENT NO. : 6,872,036 B2
DATED : March 29, 2005
INVENTOR(S) : Linderholm

It is certified that error appears in the above-identified patent and that said Letters Patent is hereby corrected as shown below:

Column 2,
Line 25, delete "or", and substitute -- for --.

Column 4,
Line 51, delete "toot", and substitute -- tool --.

Signed and Sealed this

Third Day of January, 2006

JON W. DUDAS
*Director of the United States Patent and Trademark Office*